United States Patent
Howell et al.

(10) Patent No.: US 6,411,504 B2
(45) Date of Patent: *Jun. 25, 2002

(54) PORTABLE COMPUTER HAVING LATCHING HOOKS

(75) Inventors: Bryan F. Howell, Austin; Rick Wahl, Cedar Park; Jeff Brostrom, Austin, all of TX (US); Peter Skillman, San Carlos, CA (US); Otto Deruntz, Dunstable, MA (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,120

(22) Filed: Aug. 25, 1999

(51) Int. Cl.$^7$ .................................................. G06F 1/16
(52) U.S. Cl. ........................ 361/683; 361/679; 361/686
(58) Field of Search ................................. 361/679–681, 361/683–686

(56) References Cited

U.S. PATENT DOCUMENTS 5,404,271 A * 4/1995 Satou et al. ................ 361/684
5,490,036 A 2/1996 Lin et al.
5,580,107 A 12/1996 Howell
6,266,235 B1 * 7/2001 Leman ....................... 361/681

* cited by examiner

*Primary Examiner*—Darren Schuberg
*Assistant Examiner*—Yean-Hsi Chang
(74) *Attorney, Agent, or Firm*—Haynes and Boone, LLP

(57) ABSTRACT

A portable computer includes a base, a display panel, a cover for housing the display panel, and a cover pivotally connected to the base. The display panel includes a front surface having an active area and an inactive area surrounding the active area. The cover includes a latch hook extending over a portion of the inactive area of the display panel. The latch hook secures the cover to the base when the cover in a closed position.

15 Claims, 7 Drawing Sheets

PORTABLE COMPUTER HAVING LATCHING HOOKS

BACKGROUND

The disclosures herein relate generally to portable computers and more particularly to latch hooks for latching a top portion of a portable notebook computer to a base of the computer.

Portable laptop or notebook computers include a base and a top which is pivotally connected to the base at a hinged connection. When the top is raised, a display panel such as a liquid crystal display (LCD) panel mounted therein is exposed. The LCD panels are costly components available from several manufacturing sources and are available in various sizes. In addition, the spacing and orientation of the mounting points for one manufacturer may vary from the spacing and orientation of the mounting points for another manufacturer. As a result, several different top configurations are required for mounting the various size LCD panels and their multiple mounting points. A latch device for latching a top and a base of a portable computer is described in U.S. Pat. No. 5,580,107.

LCD panels are typically mounted between a top housing and a bezel. Various size LCD panels have different "active" areas, i.e., the area of the panel that becomes illuminated and is visible. As a result, the bezel used must cover the peripheral edges of the LCD panel in a manner which exposes only the active area of a particular panel. LCD panels are more recently being side mounted to a bracket in the top housing. This has been done so that larger LCD panels can be mounted in the same size top housing as the smaller panels.

New methods are being developed to mount larger LCD panels in the top housing of the computer, while minimizing the dimensions of the top housing and the base. However, there has been a common problem of mounting these larger LCD panels without affecting the "active" area of the panels or increasing the risk of breaking the LCD glass.

In addition, with larger LCD panels there is the problem of providing a method for latching the computer top to the base when the computer is in a closed position. The top of a portable computer is typically connected to the base by a hinge on one edge and by at least one latch located on at least one other edge. When unlatched, the top is rotated open thus exposing a keyboard on the base and the LCD panel mounted in the top. The latch which secures the base and top is typically mounted along an edge of the top, outside the area of the LCD panel. As a result, the amount of space available for the latch is limited. In addition, the increase in panel size has created additional space limitations for mounting the latch in the top.

Typically the footprint, or area, of the largest LCD panel which can be mounted on a particular base must be less than the footprint of the base because the latch or latches which are mounted outside of the panel area must latch into the base when the computer is in its closed position. However, this is in conflict with the desire to have a portable computer with an LCD panel having a footprint as large as or larger than the footprint of the base of the computer.

In order to mount these larger LCD panels on an existing base, it is sometimes necessary that the computer top and/or the LCD panel overhang edges of the base. It is desirable to maximize the size of the LCD panel while minimizing the amount of this overhang. It is also be desirable to equally distribute the amount of overhang on each edge of the base. In addition, it is desirable to provide adjustable or removable latches such that LCD panels of different sizes could be mounted within a particular computer top.

Therefore, what is needed is a portable computer top which houses an oversized display panel and includes a latch which engages a substantially standard sized base without covering any part of the active area of the panel. Also, the latch must not place an amount of stress on the display panel that could damage the panel.

SUMMARY

One embodiment of the present invention, accordingly, provides a display panel cover of standard outside dimensions which can accommodate a larger display panel than presently being used. To this end, a portable computer includes a base, a display panel, and a cover for housing the display panel. The display panel includes a front surface having an active area and an inactive area surrounding the active area. The cover is pivotally connected to the base and includes a latch hook which extends over a portion of the inactive area of the display panel. The latch hook operates to secure the cover to the base when the cover is in a closed position.

A principal advantage of this embodiment is that in a portable computer, a display panel cover can be used to host various size display panels including a display panel having a footprint which is substantially as large as or larger than the footprint of the base of the portable computer.

DETAILED DESCRIPTION

Figure 1:
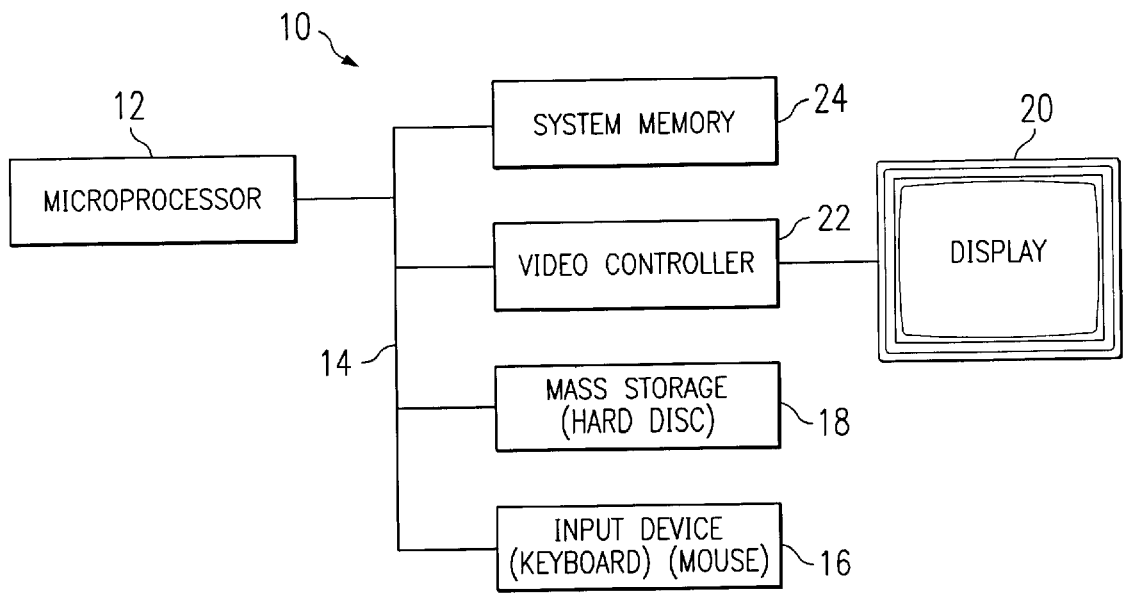
FIG. 1 is a diagrammatic view illustrating an embodiment of a computer system.

In one embodiment, as shown in FIG. 1, computer system 10 includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with a fast storage to facilitate execution of computer programs by microprocessor 12. It should be understood that the other busses and intermediate circuits can be deployed between the components described above and microprocessor 12 to facilitate interconnection between the components and the microprocessor.

Figure 2:
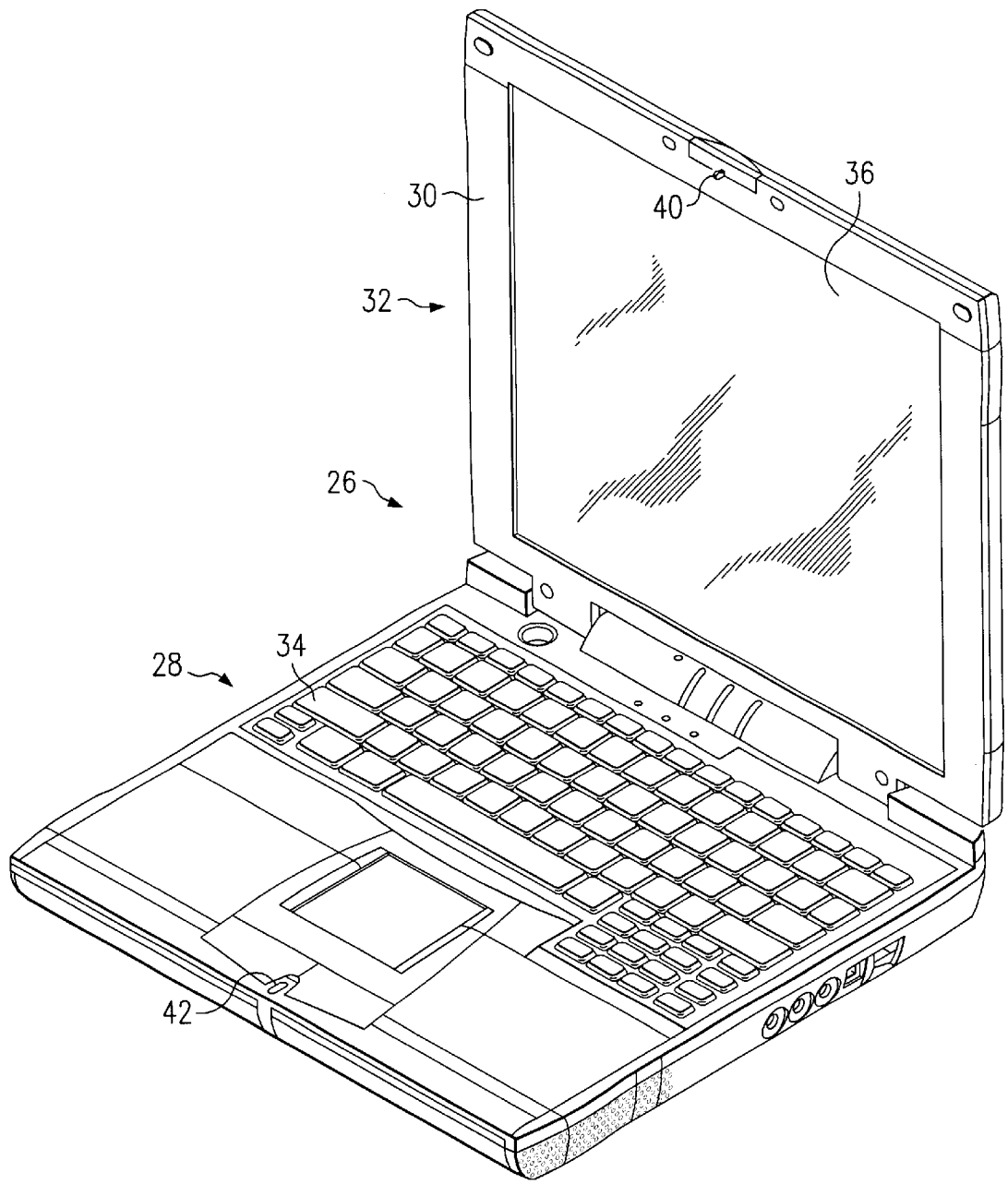
FIG. 2 is an isometric view illustrating an embodiment of a portable computer including a top in an open position.

As shown in FIG. 2, one embodiment of a portable, notebook size computer 26 comprises a self-contained system such as computer system 10, FIG. 1, and a top or cover 32 pivotally connected to a base 28 for opening and closing to expose a keypad 34 mounted on base 28 and a display panel such as an LCD panel 36, or other suitable panel, mounted in cover 32. Typically, cover 32 includes a bezel 30 and a latch hook 40. A latch releasable device 42 retains latch hook 40 to keep cover 32 engaged with base 28 when the computer 26 is in a closed position.

Figure 3:
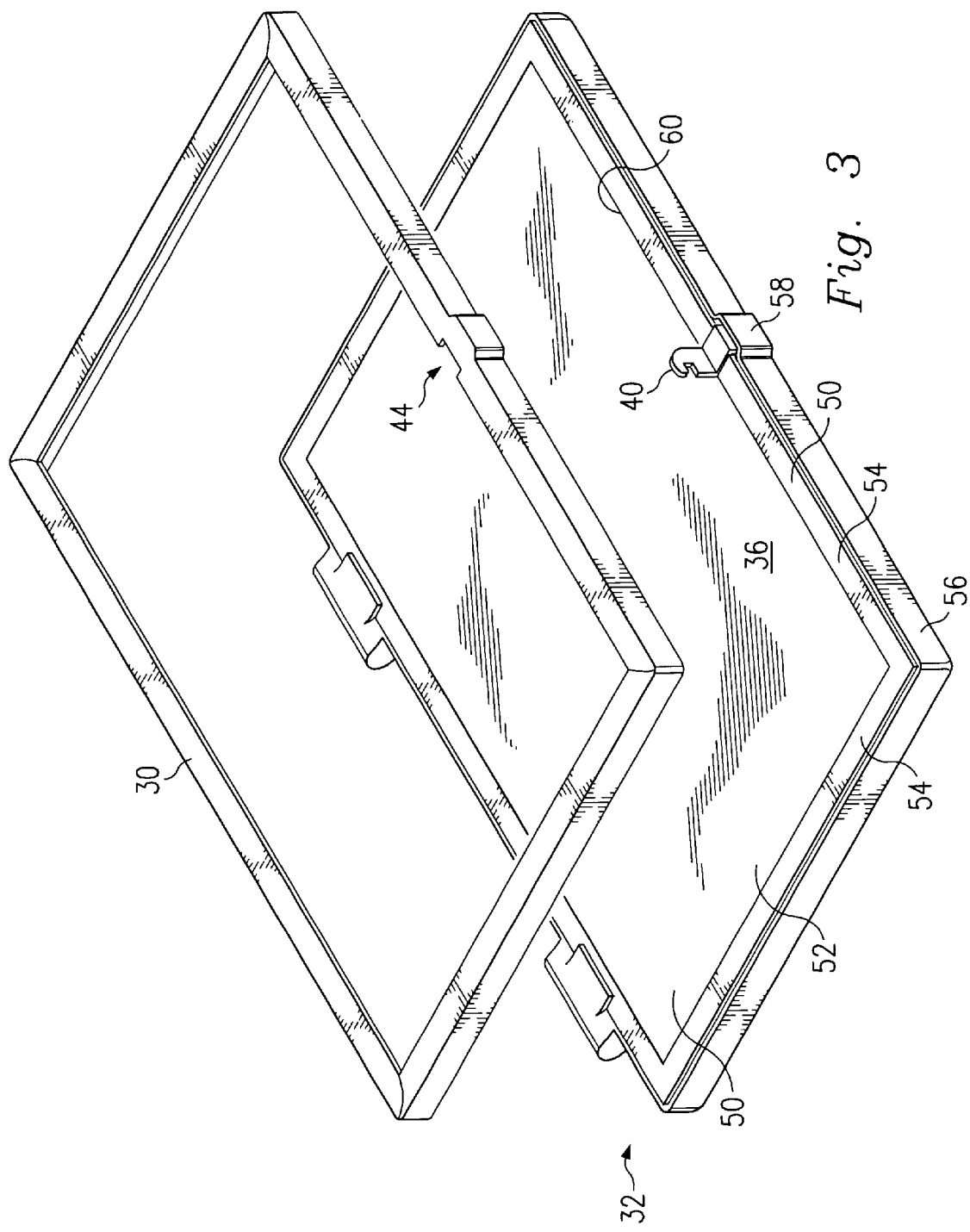
FIG. 3 is an isometric view illustrating an embodiment of an assembled cover of the portable computer.

FIG. 3 illustrates one embodiment of a cover 32 and LCD panel 36. LCD panel 36 includes a front surface 50 which includes a viewable, or "active," area 52 and a non-viewable, or "inactive," area 54 surrounding active area 52. Cover 32 includes latch hook 40, bezel 30, and an LCD housing back 56. Housing back 56 is capable of housing LCD panels of various sizes and from different manufacturers. Housing back 56 may include an expanded area 58 to accommodate latch hook 40. Housing back 56 may be formed of plastic, metal, or any other suitable material.

According to this embodiment, latch hook 40 covers a portion of inactive area 54 of LCD panel 36, and extends in a direction substantially perpendicular to front surface 50 of LCD panel 36. Latch hook 40 is adjacent an outer edge 60 of active area 52; however, latch hook 40 does not cover any part of active area 52 in any embodiment. It is an object of the present embodiments that latch hook 40 be located as close as possible to outer edge 60 in order to maximize the size of the LCD panel 36 that can be mounted in cover 32 to be used with base 28 of a particular size.

Figure 4:
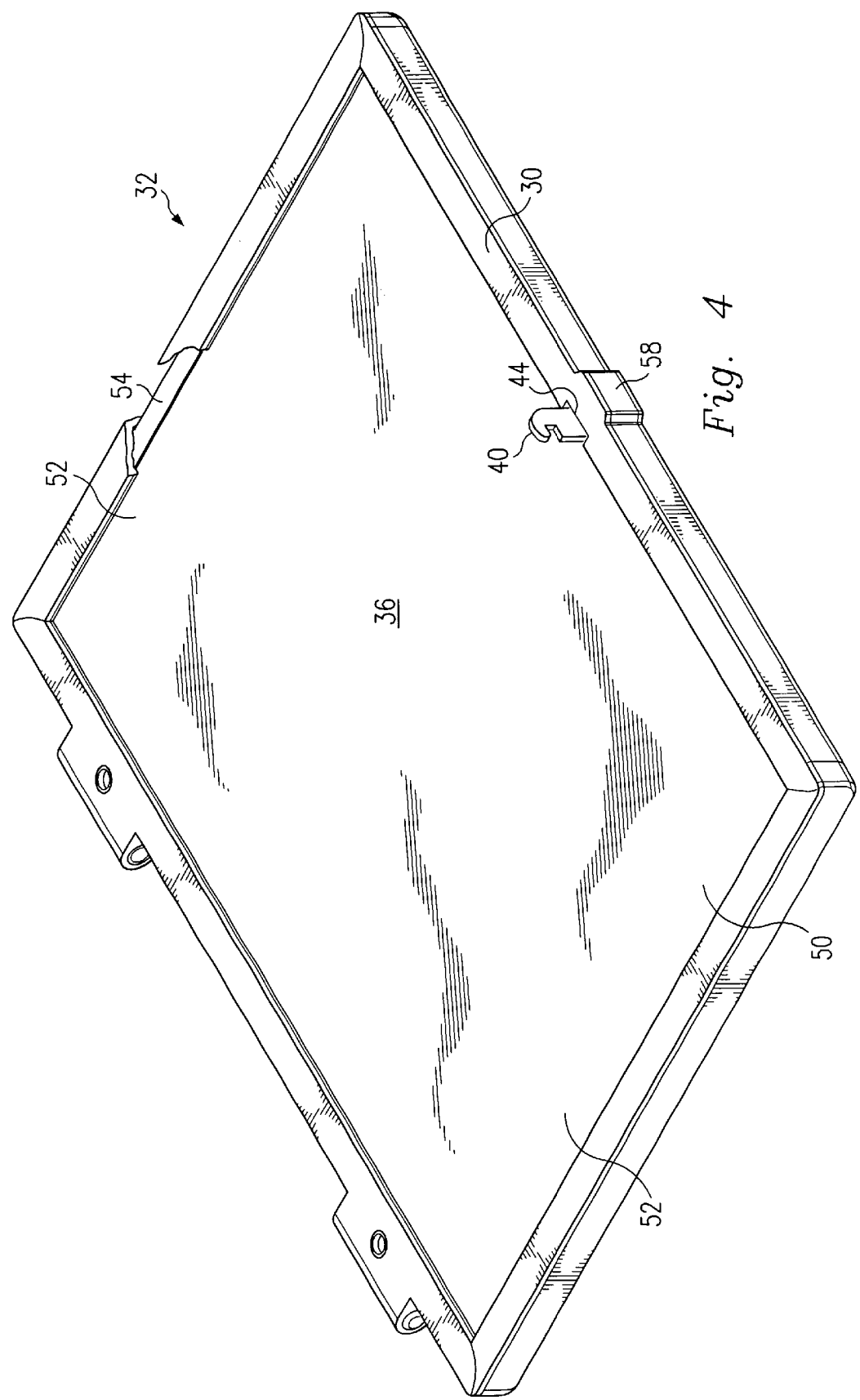
FIG. 4 is an isometric view illustrating an embodiment of the cover of the portable computer, including a display panel and a bezel.

Bezel 30 may include bezel notch 44 which receives latch hook 40 when cover 28 is fully assembled, as shown in FIG. 4. Bezel 30 may cover the entire inactive area 54 of LCD panel 36 such that only active area 52 is viewable. Bezel 30 may be formed from plastic, metal, or any other suitable material.

Figure 5:
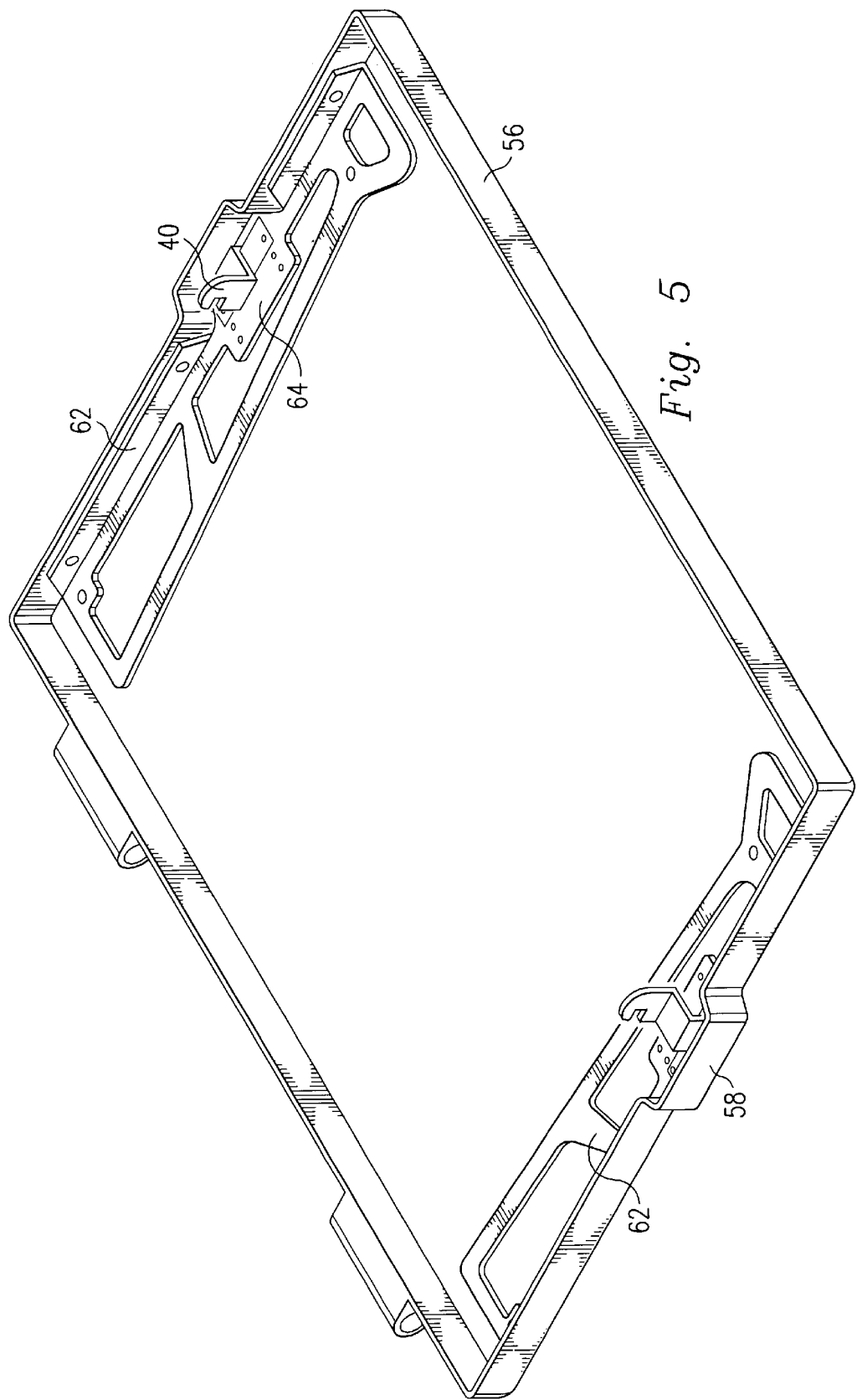
FIG. 5 is an isometric view illustrating an embodiment of the cover of the portable computer having the bezel and display panel removed.

In one embodiment, latch hook 40 is formed directly in housing back 56. In another embodiment, as shown in FIG. 5, cover 32 includes one or more brackets 62 attached to housing back 56. In this embodiment, latch hooks 40 may be removably attached to brackets 62. Brackets 62 may include one or more mounting areas 64 that allows latch hooks 40 to be interchanged, replaced, or adjusted in order to accommodate different size LCD panels 36. In addition, brackets 62 may be adjustably attached to housing back 56 to accommodate different size LCD panels 36.

Figure 6:
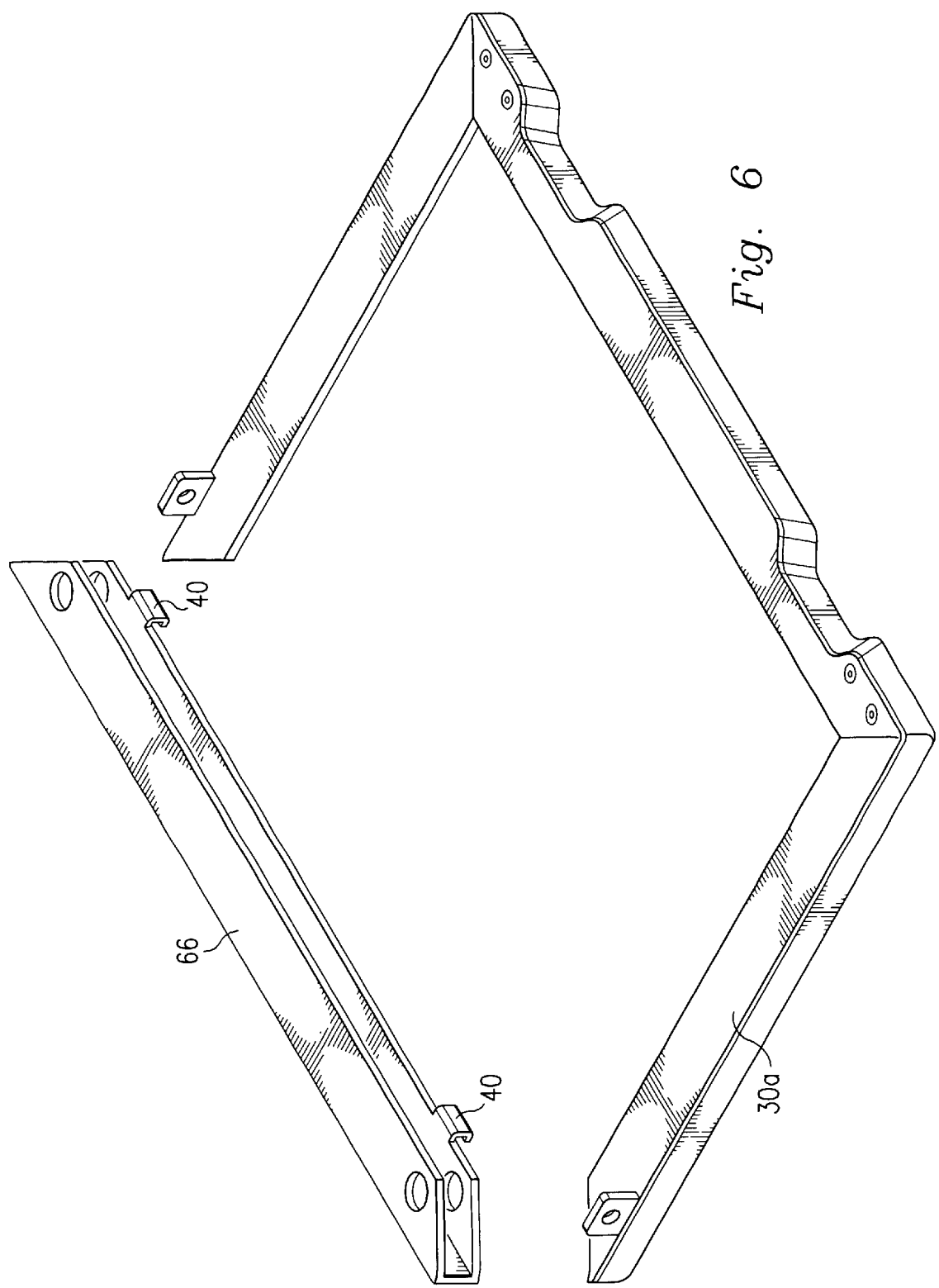
FIG. 6 is an isometric view illustrating an embodiment of a U-channel bracket and bezel assembly.

In a further embodiment, as shown in FIG. 6, a U-shaped channel 66 having latch hooks 40 extending therefrom may be mounted in cover 32. In this embodiment, the LCD panel (not shown) is received within the channel 66 such that latch hooks 40 substantially abut outer edge 60 of active area 52 of LCD panel 36 as discussed above. Channel 66 may be connected to a bezel 30a, a bracket (not shown), and/or housing back 56, FIG. 5. Bezel 30a may operate to cover the portion of inactive area 54 of LCD panel 36 not covered by channel 66. Channel 66 may be formed of metal, plastic, or any other suitable material.

Figure 7:
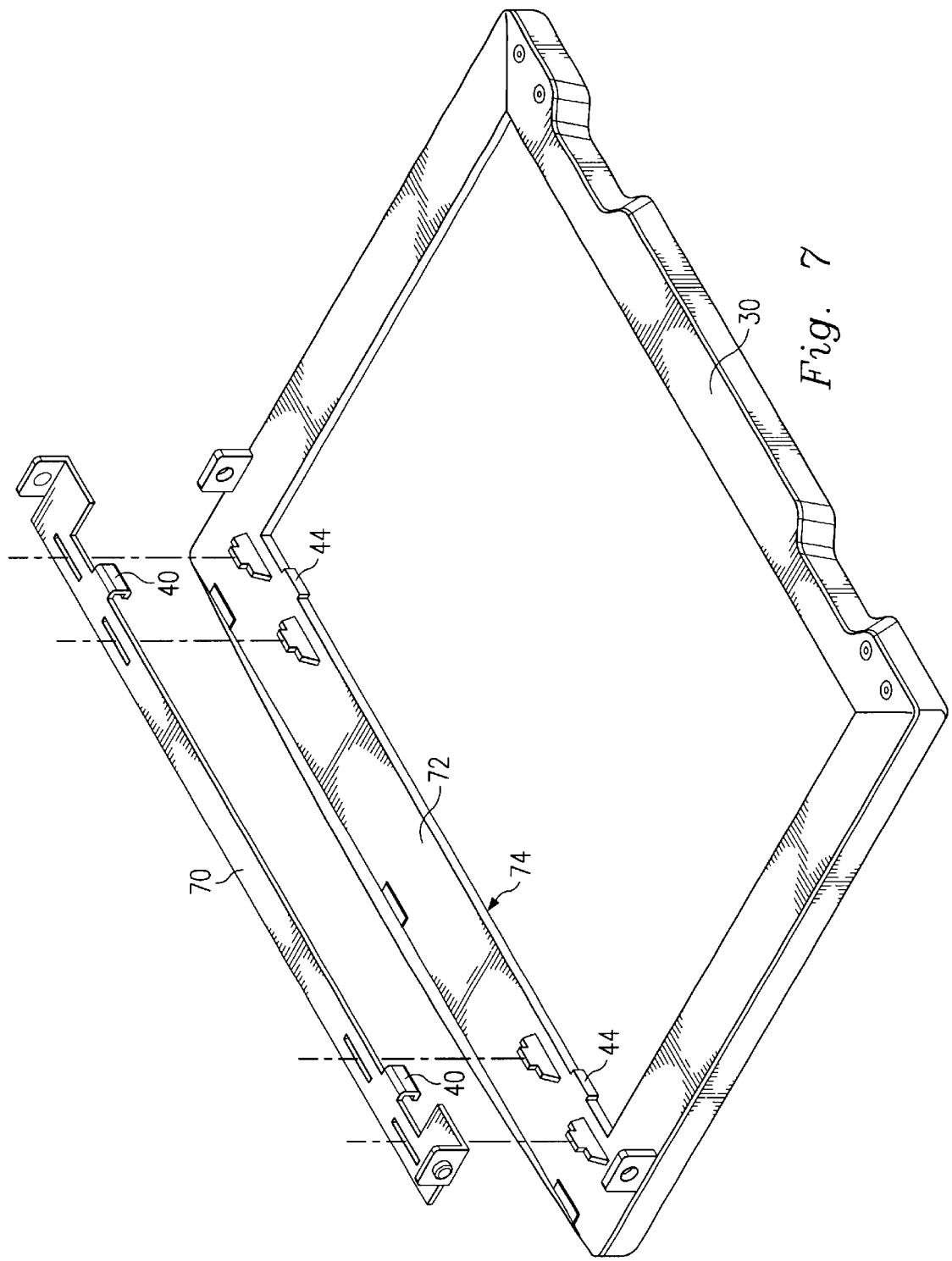
FIG. 7 is an isometric view illustrating an embodiment of a latch bracket and bezel assembly.

In yet another embodiment, as shown in FIG. 7, cover 32 (not shown) may include a latch bracket 70 having one or more latch hooks 40 formed thereon. In this embodiment, latch bracket 70 is coupled to a back side 72 of bezel 30 such that latch hooks 40 protrude through the center of the bezel adjacent an inside edge 74 of bezel 30. Bezel 30 may include bezel notches 44 to receive latch hooks 40. Latch bracket 70 may be formed of metal, plastic, or any other suitable material.

Figure 8:
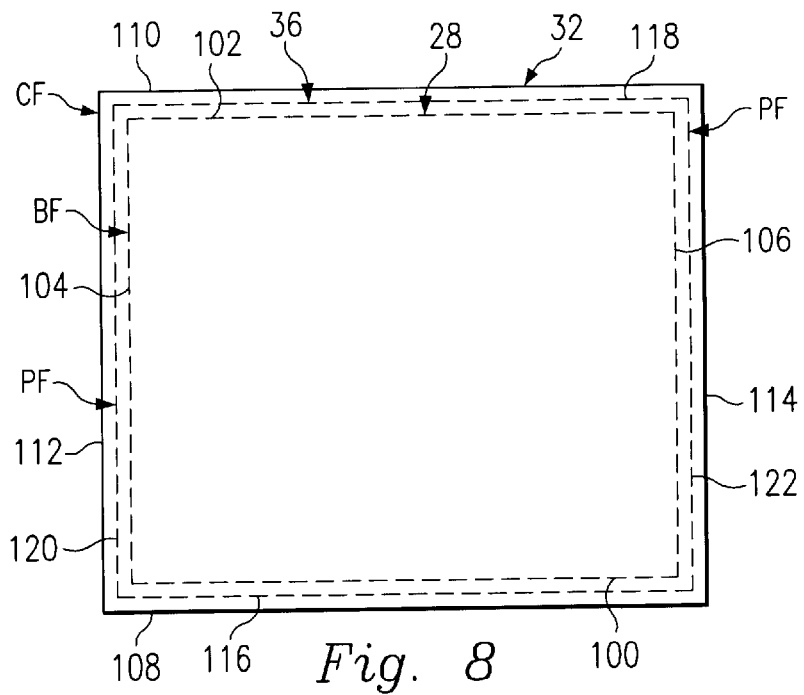
FIG. 8 is a diagrammatic view illustrating a footprint diagram of a portable computer.

Because it is an object of these embodiments to mount larger LCD panels on an existing base, the computer cover 32 or LCD panel 36 may overhang edges of base 28. In one embodiment, as shown in FIG. 8, base 28 includes four peripheral sides, one of which is front side 100. Also included is a rear side 102 opposite front side 100, a left side 104 and an opposed right side 106. Similarly, cover 32 includes a front side 108, an opposite rear side 110, and a left side 112 and an opposed right side 114. LCD panel 36 also includes a front side 116, an opposite rear side 118, a left side 120, and a right side 122. Accordingly, base sides 100, 102, 104, and 106 define a base footprint designated BF. Cover sides 108, 110, 112, 114 define a cover footprint designated CF. LCD panel sides 116, 118, 120, 122 define a panel footprint designated PF. Therefore, it can be seen from FIG. 8 that the sides of the cover footprint CF overhang the sides of the base footprint BF. It can also be seen that the sides of the panel footprint PF may overhang the base footprint BF. By overhang, is meant substantially aligned with or extending beyond the peripheral limits of an associated member.

As a result, one embodiment provides a portable computer including a base, an LCD panel, and a cover for housing the LCD panel. The LCD panel includes a front surface having an active area and an inactive area surrounding the active area. The cover is pivotally connected to the base and includes a latch hook extending over a portion of the inactive area of the LCD panel. The latch hook operates to secure the cover to the base when the cover is in a closed position.

Another embodiment provides a computer system including a microprocessor, an input coupled to provide input to the microprocessor, a mass storage coupled to the microprocessor, a display coupled to the microprocessor by a video controller, and a memory coupled to provide storage to facilitate execution of computer programs by the microprocessor. The computer system also includes a portable computer base, an LCD panel, and a cover for housing the LCD panel. The LCD panel includes a front surface having an active area and an inactive area surrounding the active area. The cover is pivotally coupled to the base and includes a latch hook extending over a portion of the inactive area of the LCD panel. The latch hook operates to secure the cover to the base when the cover is in a closed position.

Yet another embodiment provides a method of accommodating a latch in a cover for housing an LCD panel. A portable computer base is provided and a cover having a latch hook is attached to the base. An LCD panel having a front surface including an active area and an inactive area surrounding the active area is mounted in the cover. The LCD panel is positioned in the cover such that the latch hook extends over a portion of the inactive area of the LCD panel and operates to secure the cover to the base when the cover is in a closed position.

As it can be seen, the principal advantages of these embodiments are that in a portable computer, an oversized display panel can be mounted in a cover to be used with a base of a substantially standard size. Also, a particular cover can be used to host various size display panels including a display panel having a footprint which is larger than the footprint of the portable computer. The available space in the cover previously used to mount a latching hook is moved to overhang the footprint of the base by moving the latching hook toward the active area of the display panel.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A portable computer comprising:

a base;

a display panel including a front surface having an active area and an inactive area surrounding the active area;

a cover for housing the display panel, the cover being pivotally connected to the base for movement between an open position and a closed position and including a latch hook extending over a portion of the inactive area of the display panel, the latch hook being operable to secure the cover to the base when the cover is in the closed position;

the cover further comprising a bracket connected to the display panel, and the latch hook being an integral part of the bracket; and the bracket being a channel with a U-shaped cross-section, and a side of the display panel being received within the channel.

2. The portable computer as defined in claim 1 wherein the active area includes an active area edge, and wherein the latch hook is substantially adjacent to the active area edge.

3. The portable computer as defined in claim 1 wherein the base includes peripheral sides which define a base footprint.

4. The portable computer as defined in claim 3 wherein the cover includes peripheral sides which define a cover footprint which is larger than the base footprint.

5. The portable computer as defined in claim 3 wherein the display panel includes peripheral sides which define a panel footprint which is larger than the base footprint.

6. A portable computer comprising:

a base;

a display panel including a front surface having an active area and an inactive area surrounding the active area;

a cover for housing the display panel, the cover being pivotally connected to the base for movement between an open position and a closed position and including a latch hook extending over a portion of the inactive area of the display panel, the latch hook being operable to secure the cover to the base when the cover is in the closed position; and the cover further comprising a bracket connected to the display panel, and the latch hook being adjustably connected to the bracket such that the cover is operable to house various sizes of display panels.

7. A computer system comprising:

a microprocessor;

an input coupled to provide input to the microprocessor;

a mass storage coupled to the microprocessor;

a video controller coupled to the microprocessor;

a memory coupled to provide storage to facilitate execution of computer programs by the microprocessor;

a portable computer base;

a display panel including a front surface having an active area and an inactive area surrounding the active area;

a cover for housing the display panel, the cover being pivotally connected to the base for movement between an open position and a closed position and including a bezel and a latch hook, the latch hook extending over a portion of the inactive area and positioned adjacent an edge of the active area of the display panel and operable to secure the cover to the base when the cover is in the closed position;

the cover further comprising a bracket connected to the display panel; and the latch hook being adjustably connected to the bracket such that the cover is operable to house various sizes of display panels.

8. The computer system as defined in claim 7 wherein the bezel covers the entire inactive area of the display panel.

9. The computer system as defined in claim 7 wherein the bezel includes a notch to accommodate the latch hook.

10. The computer system as defined in claim 7 wherein the latch hook is an integral part of the bracket.

11. The computer system as defined in claim 7 wherein the cover further comprises a second bracket connected to the display panel, and a second latch hook, wherein the latch hook is connected to the bracket and the second latch hook is connected to the second bracket.

12. The computer system as defined in claim 7 wherein the base includes peripheral sides which define a base footprint, and wherein the cover includes peripheral sides which define a cover footprint which is larger than the base footprint.

13. The computer system as defined in claim 7 wherein the base includes peripheral sides which define a base footprint, and wherein the display panel includes peripheral sides which define a panel footprint which is larger than the base footprint.

14. A computer system comprising:

a microprocessor;

an input coupled to provide input to the microprocessor;

a mass storage coupled to the microprocessor;

a video controller coupled to the microprocessor;

a memory coupled to provide storage to facilitate execution of computer programs by the microprocessor;

a portable computer base;

a display panel including a front surface having an active area and an inactive area surrounding the active area;

a cover for housing the display panel, the cover being pivotally connected to the base for movement between an open position and a closed position and including a bezel and a latch hook, the latch hook extending over a portion of the inactive area and positioned adjacent an edge of the active area of the display panel and operable to secure the cover to the base when the cover is in the closed position;

the cover further comprising a bracket connected to the display panel; and the bracket being a channel with a U-shaped cross-section, and a side of the display panel being received within the channel.

15. A method of accommodating a latch in a cover for housing a display panel comprising:

providing a portable computer base;

attaching a cover, movable between open and closed positions, and having a latch hook for securing the cover to the computer base;

mounting a display panel having a front surface, an active area, and an inactive area surrounding the active area in the cover;

positioning the display panel in the cover such that the latch hook extends over a portion of the inactive area of the display panel and operates to secure the cover to the base when the cover is in the closed position;

connecting a bracket to the display panel; and adjustably connecting the latch hook to the bracket such that the cover is operable to house various sizes of display panels.

\* \* \* \* \*